July 17, 1962 E. W. BUCK 3,044,324
ADJUSTABLE MAGNETIC DRILL MOUNT
Filed Dec. 5, 1956 4 Sheets-Sheet 2
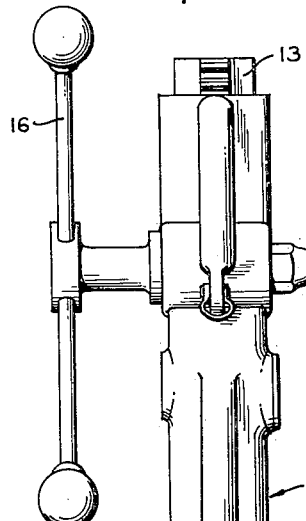
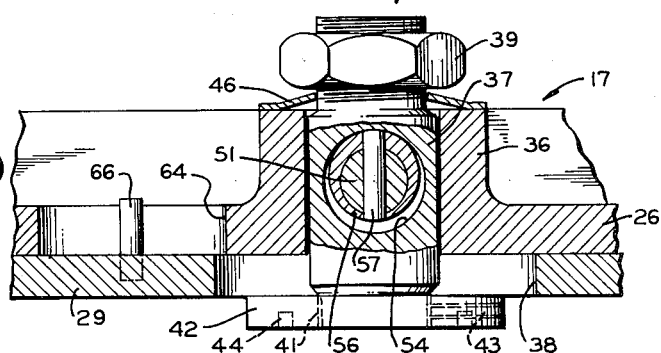
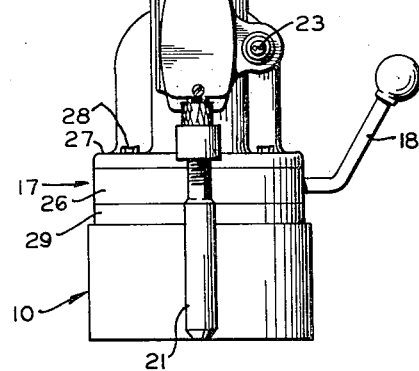
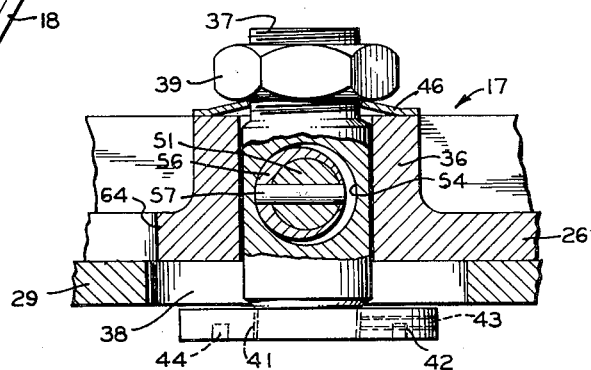
INVENTOR.
EUGENE W. BUCK
BY *Allen and Chromy*
*his* ATTORNEYS July 17, 1962 E. W. BUCK 3,044,324
ADJUSTABLE MAGNETIC DRILL MOUNT
Filed Dec. 5, 1956 4 Sheets-Sheet 3
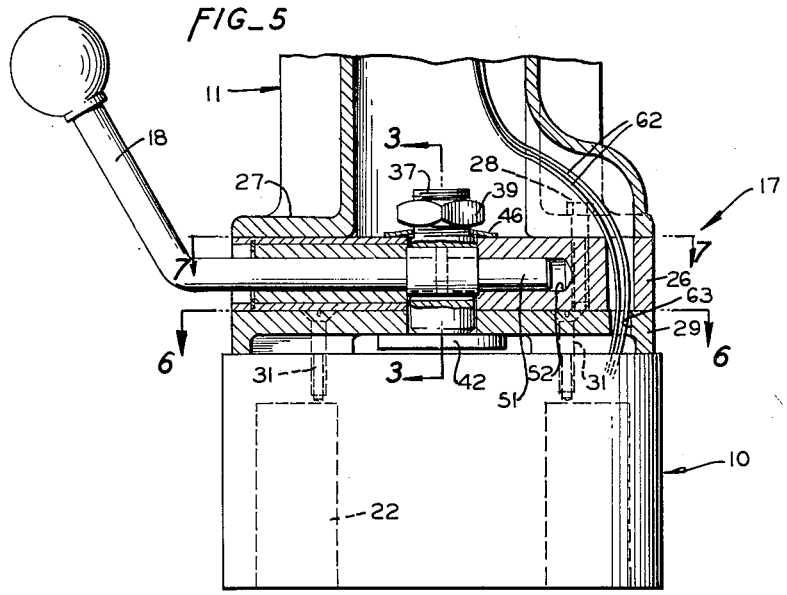
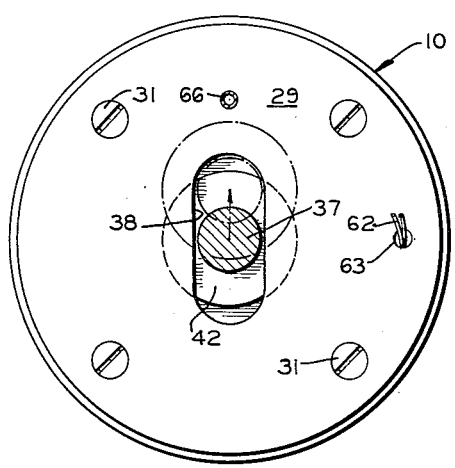
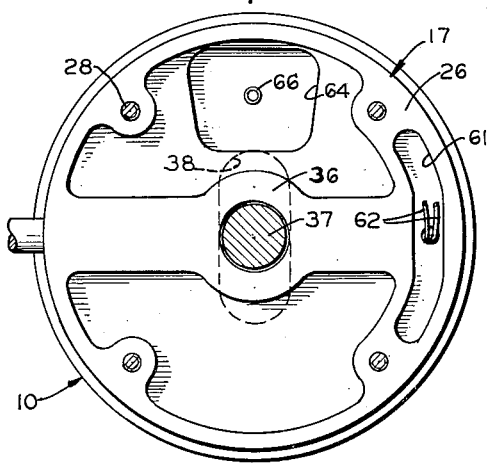
INVENTOR.
EUGENE W. BUCK
BY
*Allen and Chaney*
his ATTORNEYS July 17, 1962 E. W. BUCK 3,044,324
ADJUSTABLE MAGNETIC DRILL MOUNT
Filed Dec. 5, 1956 4 Sheets-Sheet 4
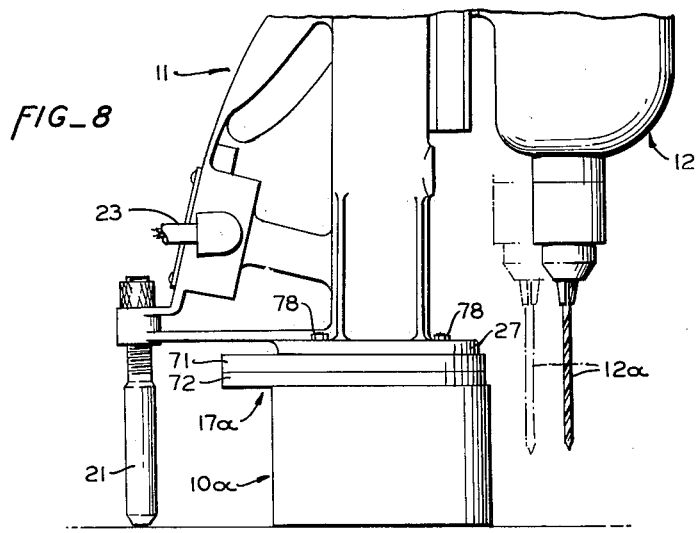
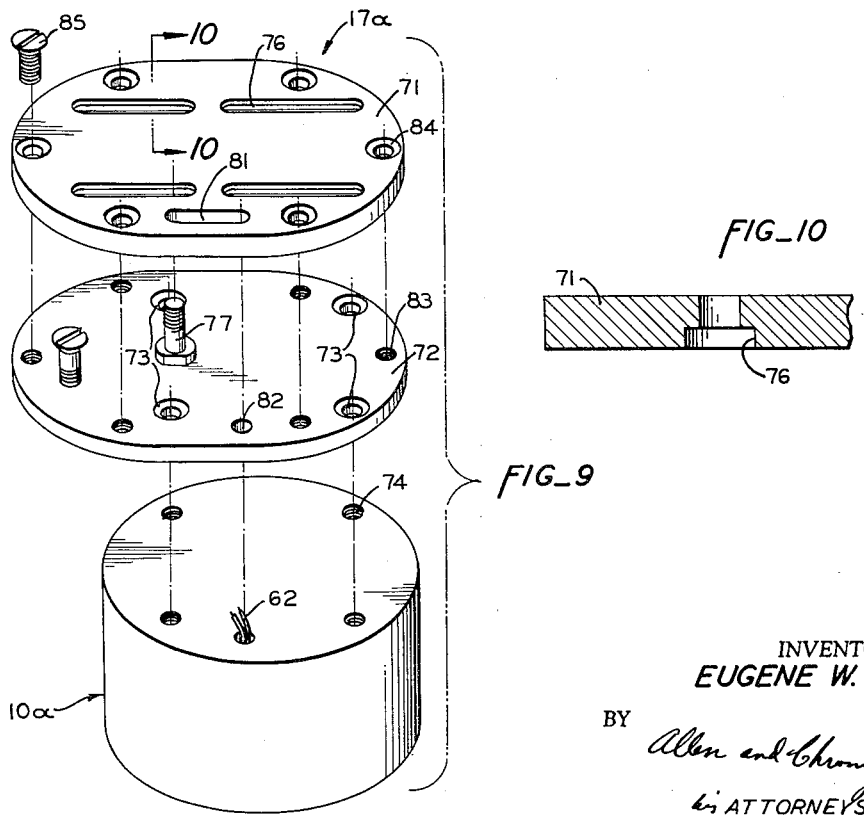
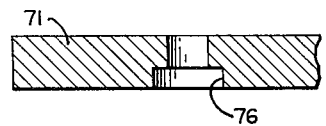
INVENTOR.
EUGENE W. BUCK
BY
ATTORNEYS United States Patent Office 3,044,324
Patented July 17, 1962

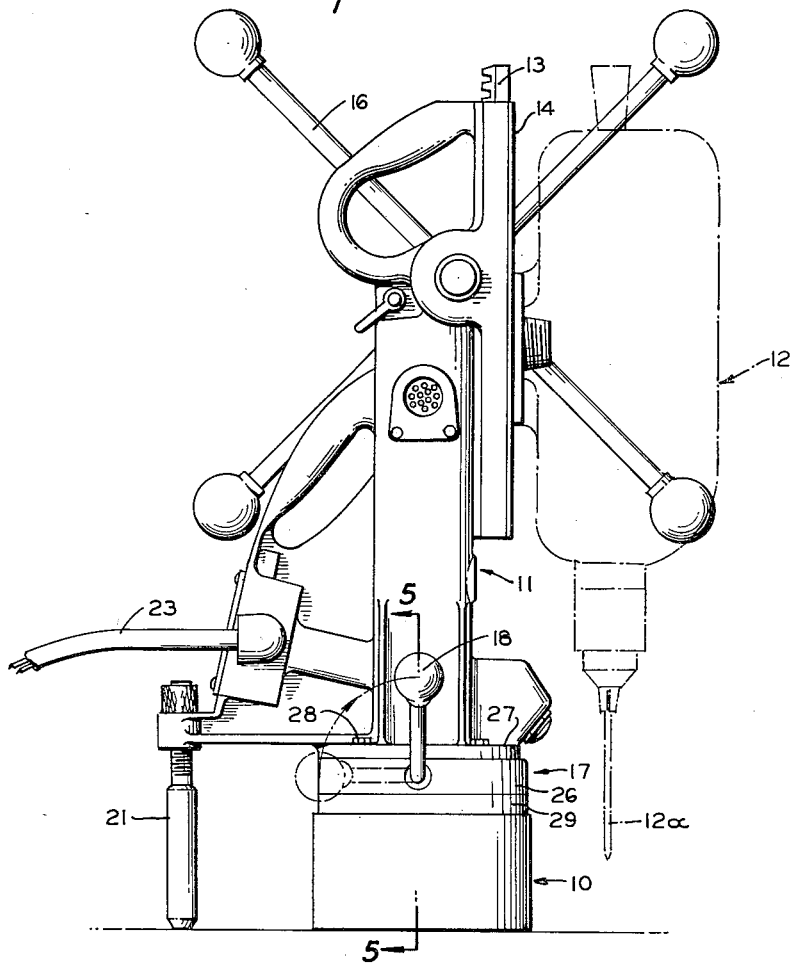

3,044,324
ADJUSTABLE MAGNETIC DRILL MOUNT
Eugene W. Buck, Campbell, Calif., assignor to Buck Manufacturing Company, San Jose, Calif., a corporation of Delaware
Filed Dec. 5, 1956, Ser. No. 626,341
2 Claims. (Cl. 77—59)

The present invention relates to portable electromagnetic drill mounts, and is concerned more particularly with an improved drill mount of the above character in which provision is made for adjusting the point of work of a tool with respect to the magnetic base for the mount.

In the operation of electromagnetic drill mounts, for example, it is desirable in certain types of work to provide for location of the drill mount on the work by energization of its magnetic base and to thereafter provide for adjustment of the drill to the point of drilling or cutting by movement of the drill or other tool on its base, thereby enabling location of the tool or structure in an approximate position and a final precision adjustment of the actual point of work by adjustment of the tool. This feature of adjustability is also desirable in certain instances in moving the location of the drill from one hole to another.

Accordingly, it is a general object of the invention to provide an improved electromagnetic drill mount in which the drill or similar tool is mounted for adjusting movement with respect to its supporting base.

Another object of the invention is to provide a drill mount of the above character in which the drill is adjustable both radially and circumferentially with respect to its magnetic supporting base.

Another object of the invention is to provide an adjustable drill mount of the above character which is constructed for economical manufacture and for easy maneuvering by the operator.

The above and other objects of the invention are attained as disclosed in the accompanying description, made with reference to the accompanying drawings, in which:

FIGURES 1 through 7 disclose one preferred embodiment of the invention.

FIGURE 1 is a side elevational view of the drill mount;

FIGURE 2 is another elevational view of the drill mount as seen from the left of FIGURE 1;

FIGURE 3 is a detail sectional view taken in a plane indicated by the line 3—3 in FIGURE 5;

FIGURE 4 is a view similar to FIGURE 3, but showing a different adjustment of the parts;

FIGURE 5 is a sectional elevational view taken in a plane indicated by the line 5—5 in FIGURE 1;

FIGURE 6 is a sectional plan view taken in a plane indicated by the line 6—6 in FIGURE 5; and FIGURE 7 is a sectional plan view taken in a plane indicated by the line 7—7 of FIGURE 5.

FIGURES 8 through 10 illustrate another preferred embodiment of the invention.

FIGURE 8 is a fragmentary side elevational view similar to FIGURE 1;

FIGURE 9 is an exploded perspective view of the parts enabling adjustment of the drill with respect to its magnetic base; and FIGURE 10 is a fragmentary sectional view taken as indicated by the line 10—10 in FIGURE 9.

In general, the adjustable electromagnetic drill mount as disclosed in FIGURE 1, for example, comprises an electromagnetic base 10 forming a part of a frame structure including an upright housing or post structure 11, on which a portable electric drill 12 is mounted in a conventional manner on a slide 13 carried in suitable guides 14. The slide 13 is adjustable vertically with the drill 12 thereon by means of the operating handle 16 in a conventional manner, for example, as disclosed in my application Serial No. 433,582, filed June 1, 1954. Between the post structure 11 and the base 10 there is provided an adjusting structure 17 having a locking handle 18 described in detail hereinafter. The drill mount also includes a stabilizing means or foot 21 and suitable electrical means for energizing the coil 22 of the electromagnetic base 10 through a rectifier structure (not shown) and including an outlet cord 23.

Referring to FIGURES 3 through 7, the adjusting structure includes an upper member or plate 26 which is secured to the flange 27 formed at the base of the post 11 by a plurality of cap screws 28, and a lower plate 29 secured by suitable screws 31 to the magnetic base 10. These plates 26 and 29 of the adjusting structure are connected to each other for relative radial movement and for relative circumferential movement, and for this purpose the upper plate 26 is provided with a center apertured boss 36 to pivotally receive a connecting stud or post 37 also rotatably and slidably engaged with a slot 38 of the lower plate 29. The upper end of the post 37 is threaded to receive a securing nut 39 and its lower reduced end 41 is threaded to receive a threaded washer or collar 42 secured in place by a nylon set screw 43. The washer 42 has suitable recesses 44 therein for engagement by a spanner wrench. A lock washer 46 of spring metal is provided between the nut 39 and the boss 36. It will be seen by virtue of the above construction that the upper plate 26 and the post and frame structure 11 connected thereto can be adjusted both rotatably and radially with respect to the magnetic base 10 to which the lower plate 29 of the adjusting structure is secured.

Clamping or locking means is associated with the two plates 26 and 29 to secure them releasably in a selected adjusted position, and for this purpose there is provided a shaft 51 (FIGURE 5) carried in a transverse aperture 52 of the upper plate 26 and extending through an enlarged transverse aperture 54 in the post 37. Within the aperture 54 of the post 37 the shaft 51 carries a locking cam or eccentric 56 pinned thereto by a pin 57.

With the parts adjusted as shown in FIGURE 3, i.e., with the handle 18 in the upright full line position of FIGURE 1, the magnetic base 10 is clamped or locked to the upper structure of the drill mount and by rotating the handle 19 through 90° to its dotted line position, to place the eccentric 56 in the position shown in FIGURE 4, the parts can be released for adjustment of the drill to a desired location.

Means are provided for protecting the electrical wiring from the base 10 in its passage through the adjustable parts of the adjusting structure, and this means includes an elongated arcuate recess 61 in the plate 26 (FIGURE 7) through which the wires 62 extend from within the post structure 11 to and through an aperture 63 on the plate 29 and thence to the coil 22. There is also provided a generally trapezoidal shaped recess 64 extending through the plate 26 and cooperating with a pin 66 carried by the plate 29. The pin 66 and the recess 64 serve to limit the extent of adjusting movement of the two plates 26 and 29 with respect to each other and with the recess 61, to maintain the wires 62 at all times free from any binding action.

In operation the drill mount is placed in an approximate desired location and the coil of the electromagnetic base 10 is energized. Then moving the handle 18 to place the adjusting structure 17 in released condition, and grasping the handles 18 and 16, the operator can easily maneuver the electric drill 12 and the drill bit 12a carried thereby to an exact location. Then, without interrupting his movements or repositioning of his hands, the handle 18 can again be turned to its locking or clamping position.

Referring to FIGURE 8, there is shown a modified form of the invention to be used where it is only desirable to adjust the drill bit 12a radially with respect to the electromagnetic base 10a, and in this form of the invention the adjusting structure 17a is also made up of an elongated upper plate 71 and an elongated lower plate 72 for attachment to each other and to the electromagnetic base 10a by suitable fastening screws or bolts.

The lower plate 72 is provided with four fastening apertures 73, and the electromagnetic base 10a is provided with a corresponding number and like pattern of apertures 74, thus enabling mounting of the plate 72 on the base. The lower plate 72 is also provided with six threaded apertures 83 and the upper plate 71 is provided with six countersunk apertures 84 to receive fastening screws 85 for securing the plates 71 and 72 together. As seen in FIGURE 8, the adjusting structure 17a projects to the left, but in assembly it could be made to project to the right, thereby providing a different range of adjustments.

To enable relative adjusting movement, the upper plate 71 is provided with four elongated slots 76 which are generally T-shaped in cross-section, as seen in FIGURE 10, to receive non-rotatably the heads of clamping bolts 77 which extend upwardly through the base flange 27 of the post structure 11 to receive nuts 78. By loosening the nuts 78 and thereby releasing the clamping action between the adjusting plates 71 and 72 and the base flange 27, the drill and its mounting structure including the post structure 11 can be moved with respect to the electromagnetic base 10a so as to place the drill bit 12a at a desired location. In this structure the base flange 27 is utilized as one member of the adjusting structure.

To provide for free passage of the electrical wires from the electromagnetic base 10a into the post structure 11, the lower plate 72 is provided with a fifth elongated recess 81, and the upper plate 71 is provided with an aperture 82 through which the wiring passes.

In operation, to effect the desired adjustable position of the drill bit 12a, after the electromagnetic base has been energized and secured to the work surface, the nuts 78 are loosened to release the clamping action between the respective plates 71 and 72 and thereby enable the relative movement to place the drill bit 12a in the desired position. After positioning the nuts 78 are again tightened on their bolts 77 to lock or clamp the post structure 11 in the selected adjusted position.

While I have shown and described certain preferred embodiments of the invention, it will be apparent that the invention is capable of variation and modification from the form shown so that the scope thereof should be limited only by the scope of the claims appended hereto.

I claim:
1. In an electromagnetic drill mount, a frame structure comprising an upright post having means for supporting a drill bit for vertical adjusting movement with respect thereto, a base structure forming a supporting foot for said frame structure and including an electromagnet, a plate-like member secured to the upper surface of said electromagnet, a base member for said post secured thereto and engaging at its bottom surface the upper surface of said plate-like member, said plate-like member having an opening therein, said base member also having an opening therein, a clamping member extending through said openings and having means for clamping said base member and said plate-like member together, said clamping member having an aperture extending transversely therethrough, clamping means supported in said base member and having an eccentric secured thereon in said transversely extending aperture, and an opening handle for said clamping means, said clamping means serving to secure said post and said electromagnet in a selected relatively adjusted position, one of said members including means forming an elongated slot therein for passage of electrical wiring to said electromagnet.

2. In an electromagnetic drill mount, a frame structure comprising an upright post having means for supporting a drill bit for vertical adjusting movement with respect thereto, a base structure forming a supporting foot for said frame structure and including an electro-magnet, a plate-like member secured to the upper surface of said electromagnet, a base member for said post secured thereto and engaging at its bottom surface the upper surface of said plate-like member, connecting means between said plate-like member and said base member providing for adjusting movement therebetween to position said drill bit both radially and rotatively with respect to said electromagnetic base, a pair of handles on said mount providing for gripping by the hands to effect said relative adjustment, one of said handles also forming a part of clamping means for securing the drill mount in a selected adjusted position, electric wiring extending from said electromagnet to within said post, one of said members including slot means for passage of said electric wiring, and means for limiting of said radial and rotative adjustment.

References Cited in the file of this patent

UNITED STATES PATENTS

| 676,043   | Lincoln  | June 11, 1901 |
| 2,672,770 | Buck     | Mar. 23, 1954 |
| 2,938,411 | Herfurth | May 31, 1960  |

FOREIGN PATENTS

| 399,400 | France | June 28, 1909 |